United States Patent
Wang et al.

(10) Patent No.: US 8,849,221 B2
(45) Date of Patent: Sep. 30, 2014

(54) DIRECT CONVERSION TRANSMITTER AND COMMUNICATION SYSTEM UTILIZING THE SAME

(71) Applicant: MStar Semiconductor, Inc., Hsinchu County (TW)

(72) Inventors: Fu-Cheng Wang, Hsinchu County (TW); Shuo-Yuan Hsiao, Hsinchu (TW); Yuan-Yu Fu, Hsinchu County (TW); Yao-Chi Wang, Hsinchu (TW); Sheng-Che Tseng, Hsinchu County (TW)

(73) Assignee: MStar Semiconductor, Inc., Hsinchu County (TW)

( * ) Notice: Subject to any disclaimer, the term of this patent is extended or adjusted under 35 U.S.C. 154(b) by 0 days.

(21) Appl. No.: 13/678,834

(22) Filed: Nov. 16, 2012

(65) Prior Publication Data
US 2014/0141734 A1    May 22, 2014

(51) Int. Cl.
H04B 1/40 (2006.01)
H04B 1/04 (2006.01)
H04B 1/06 (2006.01)
H04B 7/00 (2006.01)

(52) U.S. Cl.
CPC .................................. *H04B 1/0475* (2013.01)
USPC ............... 455/91; 455/76; 455/112; 455/260

(58) Field of Classification Search
USPC ............... 455/76, 86, 114.1–114.2, 118, 255, 455/258–259, 264, 112, 260
See application file for complete search history.

(56) References Cited

U.S. PATENT DOCUMENTS

| | | | | |
|---|---|---|---|---|
| 5,279,042 | A * | 1/1994 | Gonzalez et al. | 33/561 |
| 5,825,254 | A * | 10/1998 | Lee | 331/25 |
| 7,301,404 | B2 * | 11/2007 | Mattisson | 331/2 |
| 8,280,322 | B2 * | 10/2012 | Zolfaghari et al. | 455/109 |
| 2004/0023625 | A1 * | 2/2004 | Jonsson | 455/121 |
| 2005/0164733 | A1 * | 7/2005 | Sato | 455/553.1 |
| 2007/0259740 | A1 * | 11/2007 | Savarese et al. | 473/409 |
| 2007/0293163 | A1 * | 12/2007 | Kilpatrick et al. | 455/84 |
| 2009/0156150 | A1 * | 6/2009 | Deleon | 455/260 |
| 2010/0215120 | A1 * | 8/2010 | Groe et al. | 375/297 |
| 2011/0128992 | A1 * | 6/2011 | Maeda et al. | 375/130 |
| 2012/0034872 | A1 * | 2/2012 | Chien | 455/41.2 |
| 2012/0064839 | A1 * | 3/2012 | Yang et al. | 455/76 |
| 2012/0302188 | A1 * | 11/2012 | Sahota et al. | 455/150.1 |

* cited by examiner

*Primary Examiner* — Simon Nguyen
(74) *Attorney, Agent, or Firm* — WPAT, PC; Justin King

(57) ABSTRACT

A direct-conversion transmitter including an oscillator, a frequency divider, a transmitter, and a filter is provided. The oscillator generates an oscillating signal with an original frequency. The frequency divider performs frequency dividing on the oscillating signal, so as to generate a carrier signal. The transmitter receives the carrier signal from the frequency divider and generates an output signal based on the carrier signal and a data signal. The filter is coupled between the frequency divider and the transmitter. The filter filters out an interference signal fed-back from the transmitter to the oscillator, wherein the interference signal may cause the oscillating signal to float.

20 Claims, 5 Drawing Sheets

DIRECT CONVERSION TRANSMITTER AND COMMUNICATION SYSTEM UTILIZING THE SAME

BACKGROUND

1. Technical Field

The present disclosure relates to communication techniques. In particular, the present disclosure relates to signal processing techniques in a direct-conversion transmitter.

2. Description of the prior art

Main trends for radio frequency (RF) communication systems nowadays are to simplify circuits, to reduce chip size, and to save in overall hardware cost. In comparison with a superheterodyne transceiver, a conventional direct-conversion transceiver has a simpler structure but is not prevalent due to immature manufacturing techniques. In recent years, with the advancements in techniques for manufacturing integrated circuits, a direct-conversion transceiver with good performance becomes practicable and accordingly draws much attention.

Figure 1:
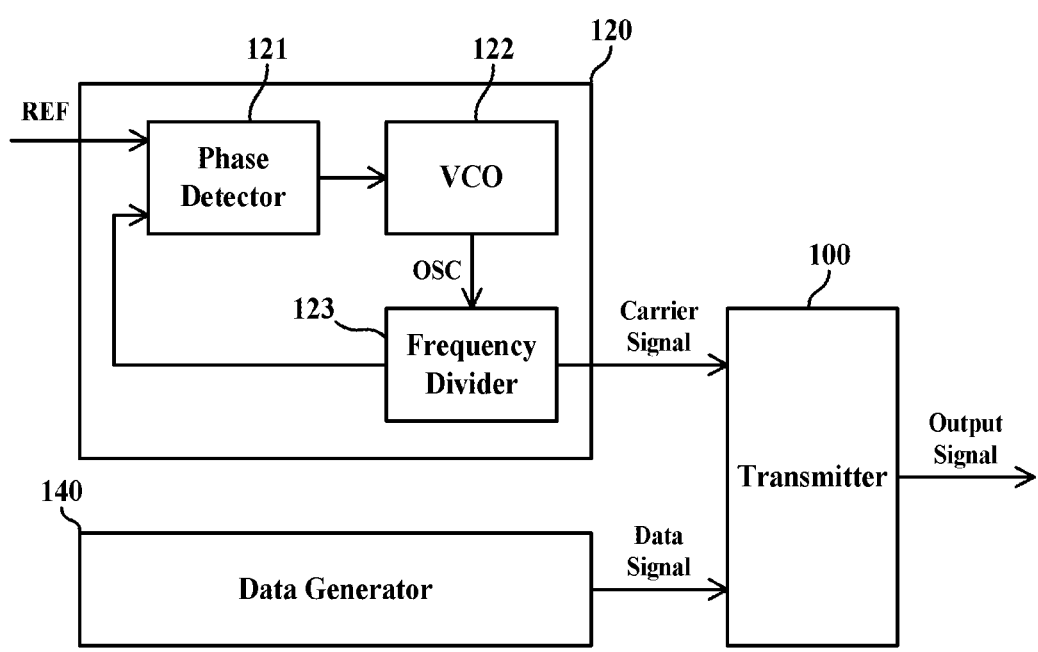

FIG. 1 illustrates one part of a conventional direct-conversion transmitter. The direct-conversion transmitter includes a phase lock loop 120, a data generator 140, and a transmitter 100. The phase-locked loop (PLL) 120 includes a phase detector 121, a voltage-controlled oscillator (VCO) 122, and a frequency divider 123. The oscillating signal generated by the voltage-controlled oscillator 122 is divided in frequency by the frequency divider 123, so as to generate a carrier signal. Based on the carrier signal and the data signal provided by the data generator 140, the transmitter 100 generates an output signal. For instance, the transmitter 100 modulates the carrier signal with the data signal in order to generate the output signal.

One problem of this direct-conversion transmitter is that the modulation process in the transmitter 100 usually causes disturbance to the VCO 122. Taking the condition that the divisor of the frequency divider 123 is equal to two (2), the frequency band of the second harmonic of the output signal in the transmitter 100 is very close to the frequency of the oscillating signal in the VCO 122. Similarly, if the divisor of the frequency divider 123 is equal to four (4), the frequency band of the fourth harmonic of the output signal is very close to the frequency of the oscillating signal in the VCO 122. This interference caused by the transmitter 100 introduces phase noise to the oscillating signal in the VCO 122 (i.e. causes the oscillating signal to float) and then inevitably decreases the output signal quality of the transmitter 100.

SUMMARY OF THE DISCLOSURE

To solve the aforementioned problem, the disclosure provides a new direct-conversion transmitter. By inserting a well-designed filter between the oscillator and transmitter, the interference from the transmitter to the oscillator may be substantially reduced.

One embodiment according to the disclosure is a direct-conversion transmitter including an oscillator, a frequency divider, a transmitter, and a filter. The oscillator generates an oscillating signal with an original frequency. The frequency divider performs frequency dividing on the oscillating signal, so as to generate a carrier signal. The transmitter receives the carrier signal from the frequency divider and generates an output signal based on the carrier signal and a data signal. The filter is coupled between the frequency divider and the transmitter. The filter filters out an interference signal fed-back from the transmitter to the oscillator, wherein the interference signal may cause the oscillating signal to float.

Another embodiment according to the disclosure is a communication system including a direct-conversion transmitter. The direct-conversion transmitter includes an oscillator, a frequency divider, a transmitter, and a filter. The oscillator generates an oscillating signal with an original frequency. The frequency divider performs frequency dividing on the oscillating signal, so as to generate a carrier signal. The transmitter receives the carrier signal from the frequency divider and generates an output signal based on the carrier signal and a data signal. The filter is coupled between the frequency divider and the transmitter. The filter filters out an interference signal fed-back from the transmitter to the oscillator, wherein the interference signal may cause the oscillating signal to float.

The advantage and spirit of the disclosure may be understood by the following recitations together with the appended drawings.

BRIEF DESCRIPTION OF THE APPENDED DRAWINGS

FIG. 1 (Prior Art) illustrates one part of an exemplary conventional direct-conversion transmitter.

Figure 2A:
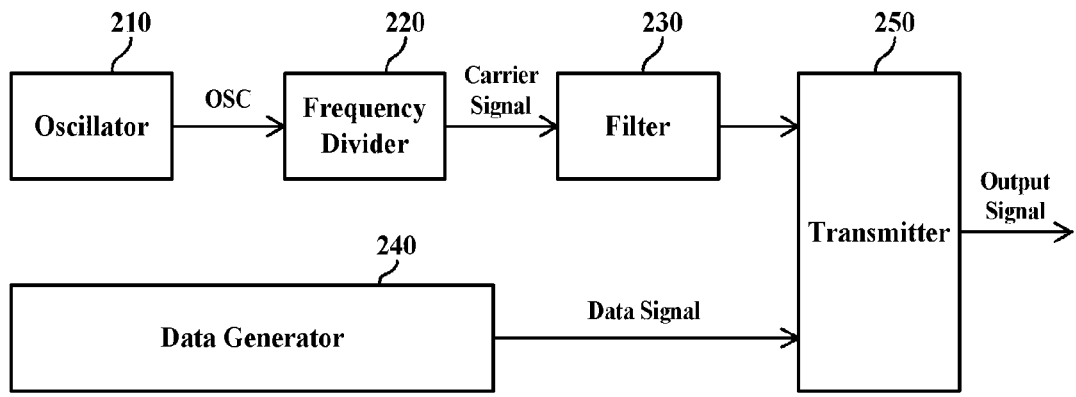
Figure 2B:
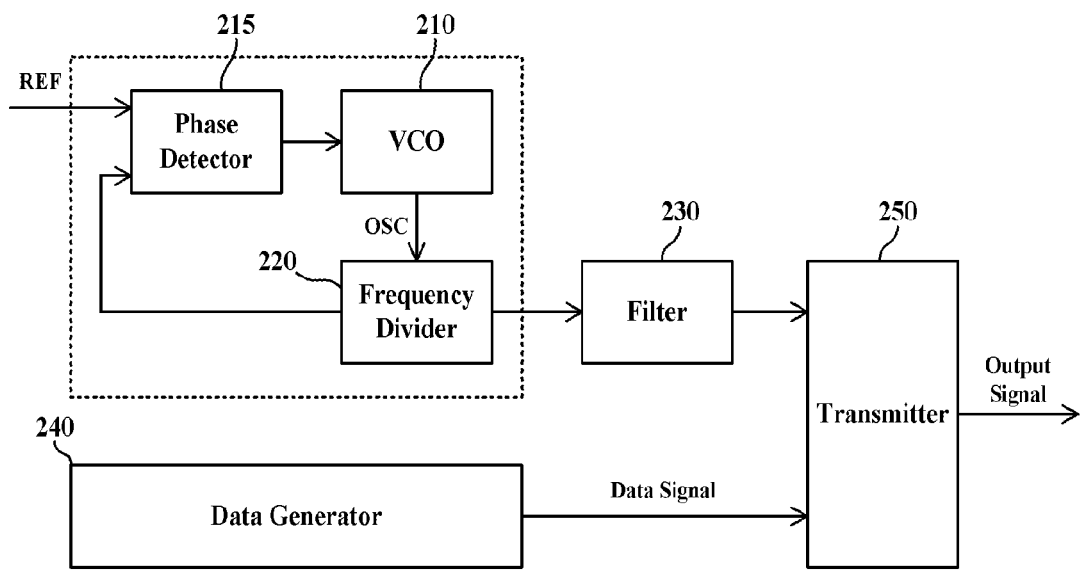

FIG. 2(A) and FIG. 2(B) show the block diagram of the direct-conversion transmitter in one embodiment according to the disclosure.

In FIG. 3(A)~FIG. 3(E), several examples of the filter according to the disclosure are illustrated.

Figure 4:
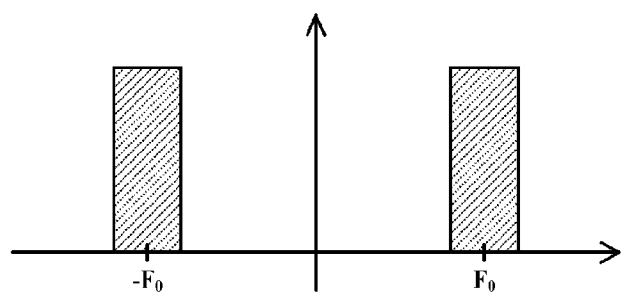

In FIG. 4, exemplary stop-bands of the filter according to the disclosure are illustrated.

DETAILED DESCRIPTION OF THE DISCLOSURE

FIG. 2(A) shows a direct-conversion transmitter 200 in one embodiment according to the present disclosure. The direct-conversion transmitter 200 includes an oscillator 210, a frequency divider 220, a filter 230, a data generator 240, and a transmitter 250. In practice, this direct-conversion transmitter 200 may be independently manufactured or be integrated in various communication systems utilizing the direct-conversion structure.

The oscillator 210 generates an oscillating signal OSC with an original frequency $F_O$. The frequency divider 220 is coupled to the oscillator 210 and performs frequency dividing on the oscillating signal to generate a carrier signal with a carrier frequency $F_C$. Based on the carrier signal and the data signal provided by the data generator 240, the transmitter 250 generates an output signal. As shown in FIG. 2(B), in practice, the oscillator 210 is a voltage-controlled oscillator (VCO). VCO 210, a phase detector 215, and the frequency divider 220 form a phase-lock loop (PLL). The PLL generates the oscillating signal OSC and the carrier signal according to a reference signal REF. In the following paragraphs, the structure illustrated in FIG. 2(B) is taken as an example to explain the essence of the present disclosure, but the scope of the disclosure is not limited to this structure.

Figure 3A:
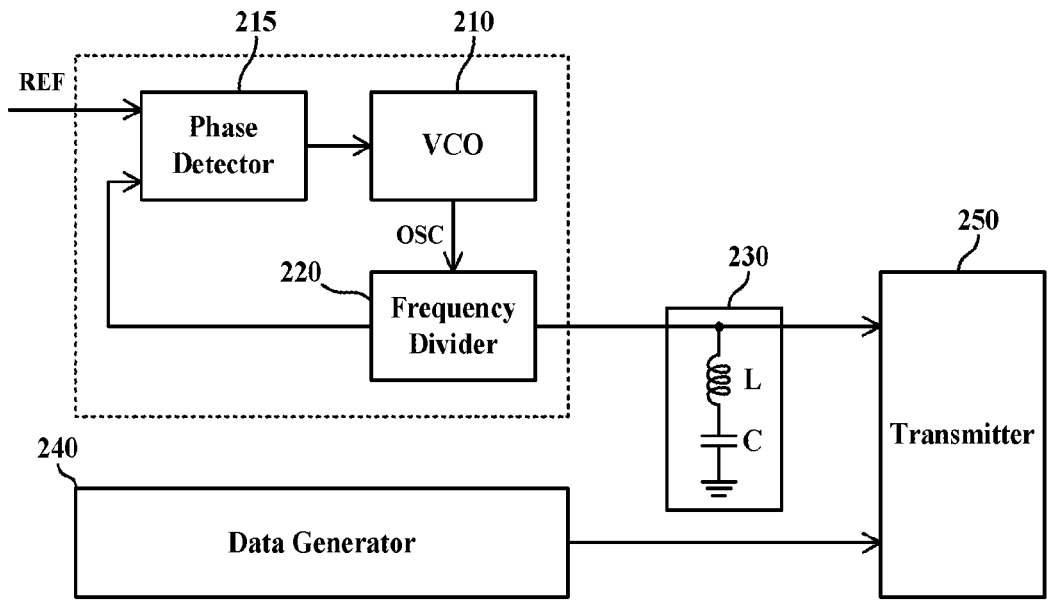

Several different embodiments of how to implement the filter in the direct-conversion transmitter in the present disclosure are illustrated in FIG. 3(A)~FIG. 3(E). In FIG. 3(A), the filter 230 coupled between the frequency divider 220 and the transmitter 250 includes an inductance component L and a capacitance component C connected in serial between the ground node and the path for forwarding the carrier signal to the transmitter 250. The inductance component L and capacitance component C are designed to allow the pass of signals with frequency equal to the carrier frequency $F_C$ and to block signals with frequency close to the original frequency $F_0$, so as to meet the following requirements.

To be specific, with the filter 230, the carrier signal provided by the frequency divider 220 may still pass to the transmitter 250 via the connection path; thus, the overall function of this direct-conversion transmitter is not affected. On the contrary, the interference with frequency close to the frequency $F_0$ that might be fed-back to the voltage-controlled oscillator 210 via this connection path is blocked by the filter 230. Exemplary stop-bands (shown as shaded regions) of the filter 230 are illustrated in FIG. 4. Even if the interference is not completely filtered out, the power level of the interference may be considerably attenuated. That is to say, the interference from the transmitter 250 to the voltage-controlled oscillator 210 is greatly reduced, and the output signal of the transmitter 250 may keep its shape. The aforementioned interference could be the harmonics of the output signal of the transmitter 250 and/or noises induced by other reasons.

It is to be noted that in other embodiments, the filter 230 may be disposed at other critical paths between the oscillator 210 and the transmitter 250. For instance, the filter 230 may also be disposed at a power transmission line, a ground line, or any path that may introduce interference from the transmitter 250 to the oscillator 210. The number of filters 230 is not limited to any specific embodiment. The circuit designer may plan the position and number of filters upon design choices.

Figure 3B:
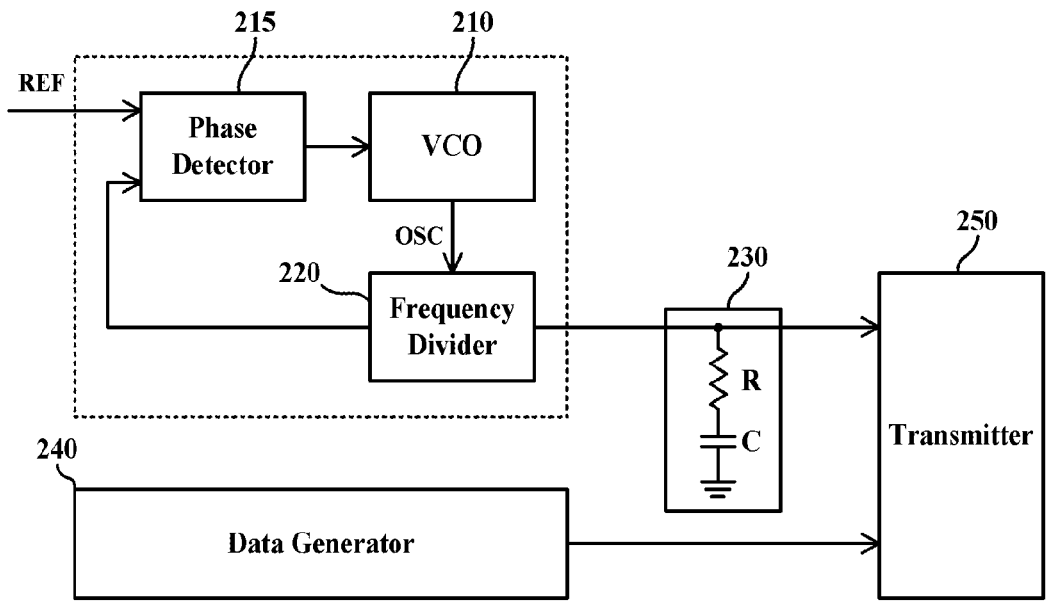
Figure 3C:
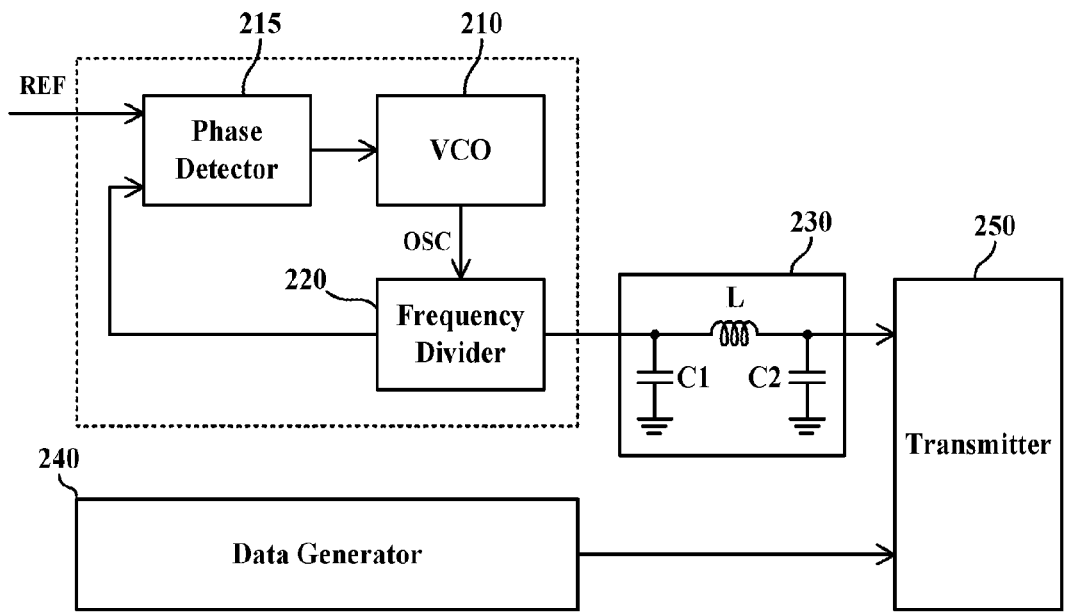
Figure 3D:
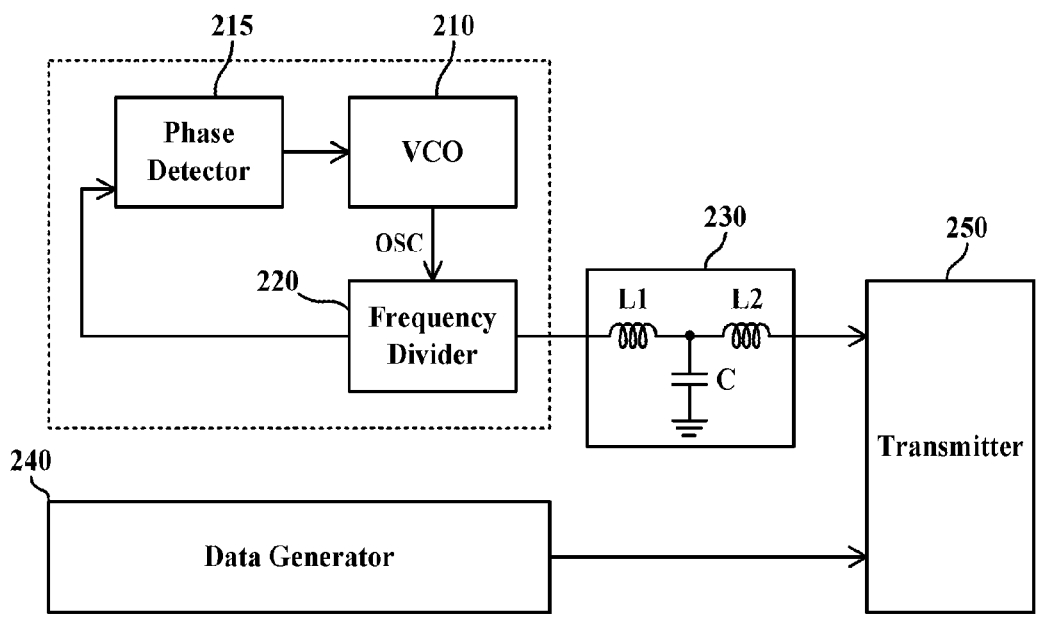
Figure 3E:
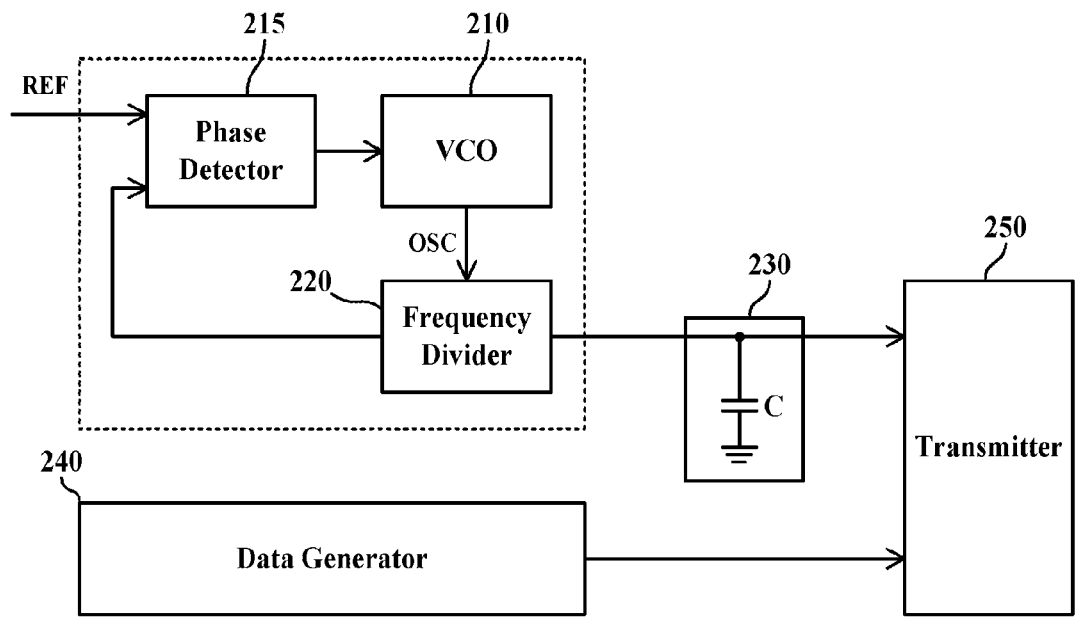

Furthermore, FIG. 3(B) shows an embodiment of the filter 230 that includes one resistance component R and one capacitance component C connected in serial between the ground node and the path for forwarding the carrier signal to the transmitter 250. As for the embodiment shown in FIG. 3(C), the filter 230 includes one inductance component L and two capacitance components C1/C2. In FIG. 3(D), another embodiment of the filter 230 includes two inductance components L1/L2 and one capacitance component C. In FIG. 3(E), the filter 230 includes one capacitance component C. In practice, the filter 230 may be designed as a low-pass filter or a notch filter; as long as the stop-band of the filter is located around the original frequency $F_0$, the goal of blocking interference to the oscillator may be achieved.

Moreover, the filter 230 may have common power transmission lines (including power supply lines and/or ground lines) with the transmitter 250 while the phase-locked loop that includes the voltage-controlled oscillator 210 does not have common power transmission lines with the filter. This design may prevent the interference entering the ground node of the filter 230 from attacking the voltage-controlled oscillator 210 via power lines.

As described above, the disclosure provides a new direct-conversion transmitter. By inserting a well-designed filter between the oscillator and transmitter, the interference from the transmitter to the oscillator may be substantially reduced.

With the example and explanations above, the features and spirits of the disclosure will be hopefully well described. Those skilled in the art will readily observe that numerous modifications and alterations of the device may be made while retaining the teaching of the disclosure. Accordingly, the above disclosure should be construed as limited only by the metes and bounds of the appended claims.

What is claimed is:

1. A direct-conversion transmitter, comprising:
an oscillator, generating an oscillating signal with a first frequency;
a frequency divider, receiving the oscillating signal with said first frequency from the oscillator and outputting a carrier signal by performing frequency dividing on the oscillating signal;
a transmitter, receiving the carrier signal from the frequency divider via a connection path, and generating an output signal based on the carrier signal and a data signal; and
a filter, connecting to said connection path, wherein said filter filters out an interference signal that feeds back to said oscillator via said connection path and interferes with said first frequency.

2. The direct-conversion transmitter of claim 1, wherein the oscillator is a voltage-controlled oscillator.

3. The direct-conversion transmitter of claim 1, wherein the filter is a low-pass filter or a notch filter.

4. The direct-conversion transmitter of claim 1, wherein the oscillator and the frequency divider form a phase-locked loop.

5. The direct-conversion transmitter of claim 1, wherein the filter comprises:
an inductance component, coupled between the connection path and a first node; and
a capacitance component, coupled between the first node and a ground node.

6. The direct-conversion transmitter of claim 1, wherein the filter comprises:
a resistance component, coupled between the connection path and a first node; and
a capacitance component, coupled between the first node and a ground node.

7. The direct-conversion transmitter of claim 1, wherein the filter comprises:
an inductance component, coupled in serial in the connection path;
a first capacitance component, coupled between a first end of the inductance component and a ground node; and
a second capacitance component, coupled between a second end of the inductance component and a ground node.

8. The direct-conversion transmitter of claim 1, wherein the filter comprises:
a first inductance component and a second inductance component, coupled in serial in the connection path, connecting to each other via a second node; and
a capacitance component, coupled between the second node and a ground node.

9. The direct-conversion transmitter of claim 1, wherein the filter comprises:
a capacitance component coupled between the connection path and a ground node.

10. The direct-conversion transmitter of claim 1, wherein a power transmission line of the filter is different from a power transmission line of the oscillator.

11. A communication system, comprising:
a direct-conversion transmitter, comprising:
an oscillator, generating an oscillating signal with a first frequency;
a frequency divider, receiving the oscillating signal with said first frequency from the oscillator and outputting a carrier signal by performing frequency dividing on the oscillating signal;
a transmitter, receiving the carrier signal from the frequency divider via a connection path, and generating an output signal based on the carrier signal and a data signal; and a filter, connecting to said connection path, wherein said filter filters out an interference signal that feeds back to said oscillator via said connection path and interferes with said first frequency.

12. The communication system of claim 11, wherein the oscillator is a voltage-controlled oscillator.

13. The communication system of claim 11, wherein the filter is a low-pass filter or a notch filter.

14. The communication system of claim 11, wherein the oscillator and the frequency divider form a phase-locked loop.

15. The communication system of claim 11, wherein the filter comprises:
   an inductance component, coupled between the connection path and a first node; and
   a capacitance component, coupled between the first node and a ground node.

16. The communication system of claim 11, wherein the filter comprises:
   a resistance component, coupled between the connection path and a first node; and
   a capacitance component, coupled between the first node and a ground node.

17. The communication system of claim 11, wherein the filter comprises:
   an inductance component, coupled in serial in the connection path;
   a first capacitance component, coupled between a first end of the inductance component and a ground node; and
   a second capacitance component, coupled between a second end of the inductance component and a ground node.

18. The communication system of claim 11, wherein the filter comprises:
   a first inductance component and a second inductance component, coupled in serial in the connection path, connecting to each other via a second node; and
   a capacitance component, coupled between the second node and a ground node.

19. The communication system of claim 11, wherein the filter comprises:
   a capacitance component coupled between the connection path and a ground node.

20. The communication system of claim 11, wherein a power transmission line of the filter is different from a power transmission line of the oscillator.

* * * * *